United States Patent
Jagadeesan et al.

(10) Patent No.: US 7,920,492 B1
(45) Date of Patent: Apr. 5, 2011

(54) DEVICES, SOFTWARES AND METHODS FOR REDUNDANTLY ENCODING A DATA STREAM FOR NETWORK TRANSMISSION WITH ADJUSTABLE REDUNDANT-CODING DELAY

(75) Inventors: Ramanathan Jagadeesan, San Jose, CA (US); Bich Nguyen, Los Altos, CA (US)

(73) Assignee: Cisco Technology, Inc., San Jose, CA (US)

( * ) Notice: Subject to any disclaimer, the term of this patent is extended or adjusted under 35 U.S.C. 154(b) by 1194 days.

(21) Appl. No.: 11/435,002

(22) Filed: May 15, 2006

Related U.S. Application Data (62) Division of application No. 09/938,741, filed on Aug. 23, 2001, now Pat. No. 7,072,291.

(51) Int. Cl.
*H04B 3/20* (2006.01)
(52) U.S. Cl. .......................... 370/289; 370/516
(58) Field of Classification Search .......... 370/231–232, 370/234, 236.1, 236.2, 238, 252, 352, 356, 370/395.4, 509, 511, 51, 6; 709/22.01, 22.02; 704/262, 258, 219, 220
See application file for complete search history.

(56) References Cited

U.S. PATENT DOCUMENTS

| | | | |
|---|---|---|---|
| 5,153,877 A | 10/1992 | Esaki et al. | |
| 5,159,452 A * | 10/1992 | Kinoshita et al. | 370/474 |
| 5,608,738 A * | 3/1997 | Matsushita | 714/752 |
| 5,793,976 A | 8/1998 | Chen et al. | |
| 5,850,385 A | 12/1998 | Esaki | |
| 5,864,541 A | 1/1999 | Abu-Amara et al. | |
| 5,870,412 A * | 2/1999 | Schuster et al. | 714/752 |
| 5,883,819 A | 3/1999 | Abu-Amara et al. | |
| 6,073,180 A | 6/2000 | Onoda et al. | |
| 6,081,907 A * | 6/2000 | Witty et al. | 714/6 |
| 6,085,252 A * | 7/2000 | Zhu et al. | 709/231 |
| 6,167,051 A | 12/2000 | Nagam et al. | |
| 6,285,658 B1 | 9/2001 | Packer | |
| 6,310,857 B1 * | 10/2001 | Duffield et al. | 370/253 |
| 6,512,762 B1 * | 1/2003 | Renucci et al. | 370/352 |
| 6,674,718 B1 | 1/2004 | Heddes et al. | |
| 6,700,893 B1 * | 3/2004 | Radha et al. | 370/412 |
| 6,757,654 B1 * | 6/2004 | Westerlund et al. | 704/262 |

(Continued)

FOREIGN PATENT DOCUMENTS

WO WO99/33232 7/1999

OTHER PUBLICATIONS

Borden et al., "RFC 1821—Integration of Real-Time Services in an IP-ATM Network Architecture," Aug. 1995, IETF.

(Continued)

*Primary Examiner* — Ricky Ngo
*Assistant Examiner* — Phuongchau B Nguyen
(74) *Attorney, Agent, or Firm* — Stolowitz Ford Cowger LLP (57) ABSTRACT

Devices, softwares and methods are provided for redundantly encoding a data stream into frames for network transmission as packets. A main encoder encodes a data stream into main frames, while a redundant encoder encodes it into redundant frames. The redundant frames have a redundant-coding delay from the main frames that is adjustable to accommodate many different sets of network conditions.

39 Claims, 6 Drawing Sheets

U.S. PATENT DOCUMENTS

| | | |
|---|---|---|
| 6,816,464 B1 | 11/2004 | Scott et al. |
| 6,920,109 B2 | 7/2005 | Yazaki et al. |
| 6,931,017 B2 | 8/2005 | McGowan |
| 7,304,962 B1 * | 12/2007 | Kirla et al. .................... 370/289 |
| 7,808,912 B2 | 10/2010 | Graham et al. |
| 2002/0091969 A1 | 7/2002 | Chen et al. |
| 2002/0167937 A1 | 11/2002 | Goodman |
| 2005/0152339 A1 | 7/2005 | Scott et al. |

OTHER PUBLICATIONS

E. Crawley et al., "A Framework for QoS-based Routing in the Internet," Network Working Group, Aug. 1998, Download Jan. 30, 2009 from http://tools.ietf.org/html.rfc2386.

Stolowitz Ford Cowger LLP, "Listing of Related Cases," Sep. 7, 2010.

* cited by examiner

DEVICES, SOFTWARES AND METHODS FOR REDUNDANTLY ENCODING A DATA STREAM FOR NETWORK TRANSMISSION WITH ADJUSTABLE REDUNDANT-CODING DELAY

This application is a divisional of prior application Ser. No. 09/938,741, filed Aug. 23, 2001, now U.S. Pat. No. 7,072,291 the contents of which are incorporated herein by reference in their entirety.

BACKGROUND OF THE INVENTION

1. Field of the Invention

The present invention is related to the field of telephony using a packet network protocol, and more specifically to devices, softwares and methods for encoding voice data to conceal packet loss.

2. Description of the Related Art

Networks such as the interne are used for telephony, in addition to sending data. Accordingly, voice is encoded into digital data, the data is arranged in packets, and the packets are transmitted to the recipient over a network. Telephony requires that this process happen in real time.

A disadvantage of protocols that permit real time use is that they are unreliable, in that they permit packets to be lost, without retrieving them. When that happens, the voice segments they were carrying are not reconstructed, and the recipient hears annoying gaps in speech. These gaps are perceived as reduced quality of service.

In order to conceal the fact that a packet has been lost, redundancy schemes have been devised. Redundant packets are encoded and transmitted, which repeat aspects of the original data. If a packet is lost, its data is recovered and/or reconstructed from its corresponding redundant packet, which is hopefully not lost. A jitter buffer at the receiving end collects the primary and redundant packets, and then plays them out.

Packets tend to become lost in groups, which are called bursts. Redundant data is sent with a redundant-coding delay from the original data. The delay is chosen to be long enough to avoid large bursts of packet loss and small enough to where the resulting delay at the receiving end is tolerable.

A problem, however, is that the burst length of packet loss episodes fluctuates with time. If the burst length exceeds the chosen delay, the redundant packets will also be lost, and the redundancy scheme will not work. On the other hand, while the burst length is much smaller than the delay, the delay turns out to be unnecessarily long for playout. Accordingly, the manufacturer has to make determinations as to what delay to program into the system. And every such determination will optimize a system for one set of conditions, while rendering it sub-optimum for others.

BRIEF SUMMARY OF THE INVENTION

The present invention overcomes these problems and limitations of the prior art.

Generally, the present invention provides devices, softwares and methods for redundantly encoding and transmitting voice data through a network. The voice data is encoded in main and redundant frames, which are transmitted through the network in packets. The invention adjusts a redundant-coding delay between the original frames and the redundant frames in real time, to optimize performance for a single transmission.

The invention offers the advantage that the voice quality of VoIP is improved even in the face of large network losses, while the end-to-end delay is reduced when the network losses become small. In other words, the invention provides a system whose redundant-coding delay is optimized while performing under many different sets of conditions.

In the preferred embodiment, the invention optionally further monitors a performance of the network. It then signals to adjust accordingly the redundant-coding delay.

The invention offers the additional advantage that a manufacturer need not predict an optimum value for the redundant-coding delay, for programming into the device. The manufacturer may set an initial value, confident that the automatic adjustment provided by the invention will optimize it for the encountered set of conditions, even if they are changing.

The invention will become more readily apparent from the following Detailed Description, which proceeds with reference to the drawings, in which:

DETAILED DESCRIPTION OF THE PREFERRED EMBODIMENT(S)

As has been mentioned, the present invention provides devices, softwares and methods for redundantly encoding and transmitting voice data through a network, with an adjustable redundant-coding delay between the original data and the redundantly transmitted data. The invention is now described in more detail.

Figure 1:
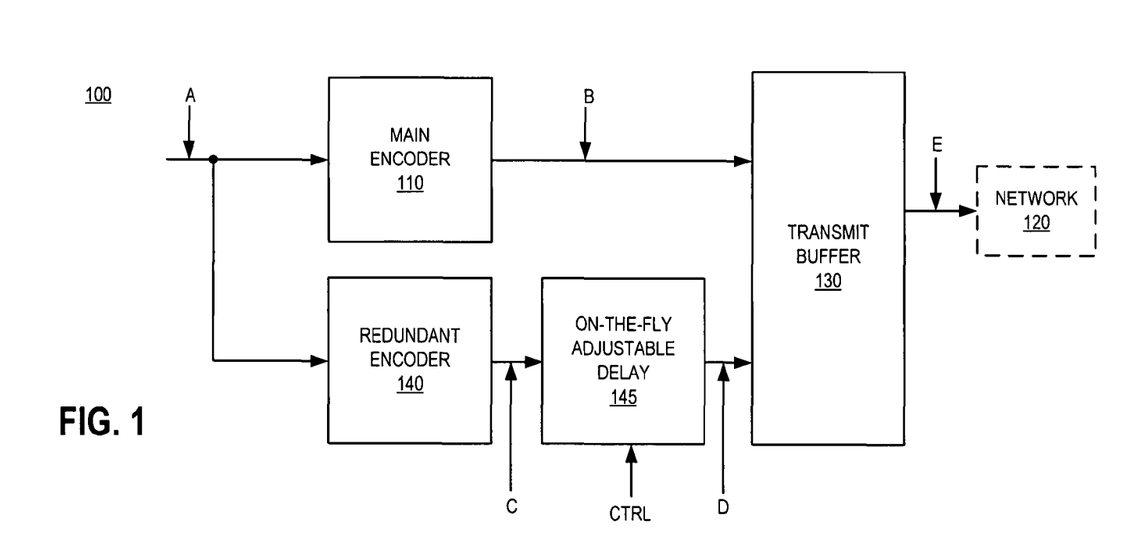
FIG. 1 is a block diagram of a transmitting device made according to an embodiment of the invention.

Referring to FIG. 1, a transmitting device 100 made according to an embodiment of the invention is described. Device 100 may be a network telephone, which is also known as an Internet Protocol (IP) phone. But device 100 may also be a network VoIP (Voice over IP) device, such as a network switch, e.g. a router, a gateway, a bridge, etc.

Device 100 includes a main encoder 110 for encoding voice data into original packets for transmission through a network 30, such as the internet. In addition, device 100 optionally includes a transmit buffer 130 adapted to receive inputs from the main encoder 110, for transmitting the encoded frame.

Device 100 also includes a redundant encoder 140 for encoding into redundant packets the same voice data as main encoder 110. The redundant packets are input in transmit buffer 130, if one is provided.

Device 100 also includes an adjustable delay for delaying the redundant packets with respect to the original packets, responsive to a control signal CTRL. The adjustable delay may be implicitly provided within any one of the components of device 100. The amount of the delay is called redundant coding delay (RCD), and may be expressed in units of time.

In some embodiments, the adjustable delay is provided explicitly as a separate component, namely an on-the-fly adjustable delay 145. Adjustable delay 145 may be provided equivalently before or after redundant encoder 140.

The operations of device 100 are now described in more detail. The operations are described in terms of how voice data is received at point A, and how it is rendered at point B for network 30.

Figure 2A:
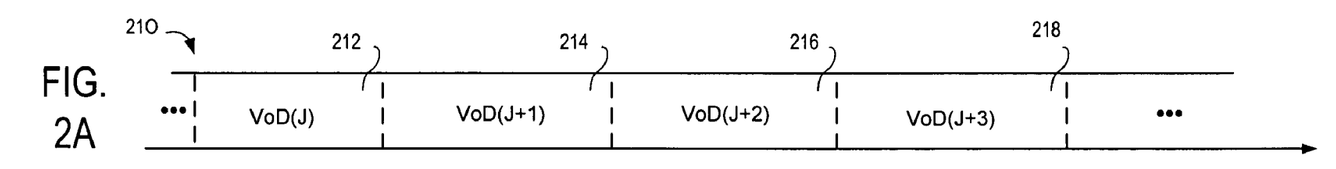
FIG. 2A is a diagram of a segment of a data stream as it passes a point A along a time axis in the device of FIG. 1.

FIG. 2A shows a segment 210 of a stream of voice data, as it passes through point A. Segment 210 is shown subdivided in successive frames 23, 214, 216, 218 of voice data VoD(J), VoD(J+1) VoD(J+2), VoD(J+3) respectively. J is an index of the frames, as they occur in the sequence of the voice data stream. Each one of frames 23, 214, 216, 218 may be 20 msec in duration, or another suitably designed value.

Figure 2B:
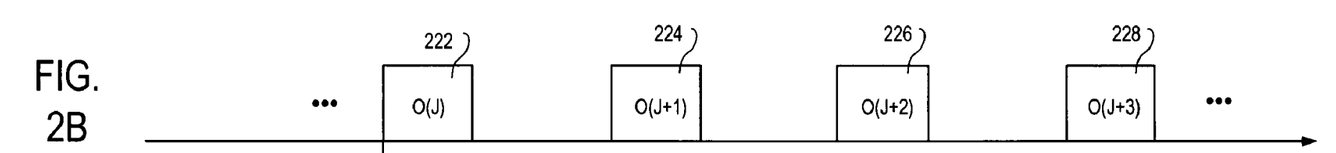
FIGS. 2B, 2C, 2D, 2E are diagrams of packets respectively at points B, C, D, and E in the device of FIG. 1 that are generated from the data of FIG. 2A, along the same time axis as FIG. 2A, according to an embodiment of the invention.

FIG. 2B shows original encoded frames O(J) 222, O(J+1) 224, O(J+2) 226, O(J+3) 228, generated by main encoder 110. These correspond to successive frames 23, 214, 216, 218 of voice data VoD(J), VoD(J+1) VoD(J+2), VoD(J+3) respectively. It will be observed that each one of original encoded frames O(J) 222, O(J+1) 224, O(J+2) 226, O(J+3) 228 occupies less time than its corresponding frame, which is a result of compression.

In fact, the original encoded frames O(J) 222, O(J+1) 224, O(J+2) 226, O(J+3) 228 may already be packetized, depending on the embodiment used. But in FIG. 2B (as well as in FIG. 2C, FIG. 2D, FIG. 2E), only the time relationships are examined.

The encoded frames in FIG. 2B (and also in FIG. 2C, FIG. 2D, FIG. 2E) should be shown slightly offset from the corresponding frames of FIG. 2A. The offset would be due to a processing delay. The offset is not shown so as to better illustrate the correspondences.

Figure 2C:
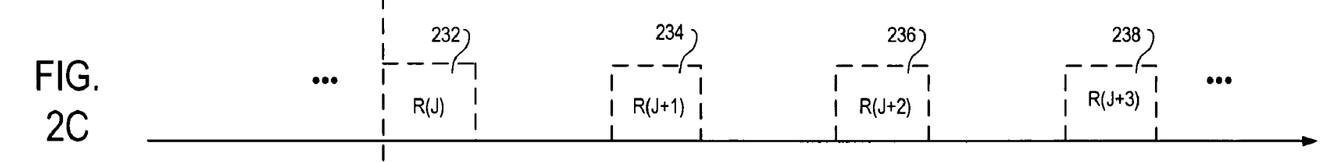

FIG. 2C shows redundant encoded frames R(J) 232, R(J+1) 234, R(J+2) 236, R(J+3) 238, generated by redundant encoder 140. These may encode the same information as their corresponding original encoded frames O(J) 222, O(J+1) 224, O(J+2) 226, O(J+3) 228, or only an aspect of it. Redundant encoded frames R(J) 232, R(J+1) 234, R(J+2) 236, R(J+3) 238 are intended to be received and used to reconstruct the original data stream, where original encoded frames have been lost.

In the embodiment of FIG. 1, redundant encoded frames R(J) 232, R(J+1) 234, R(J+2) 236, R(J+3) 238 are generated at the same time as their corresponding original encoded frames O(J) 222, O(J+1) 224, O(J+2) 226, O(J+3) 228. That is because redundant encoder 140 receives the same inputs as main encoder 110, and at the same time, while the delay 145 is provided as an explicitly separate unit.

Figure 2D:
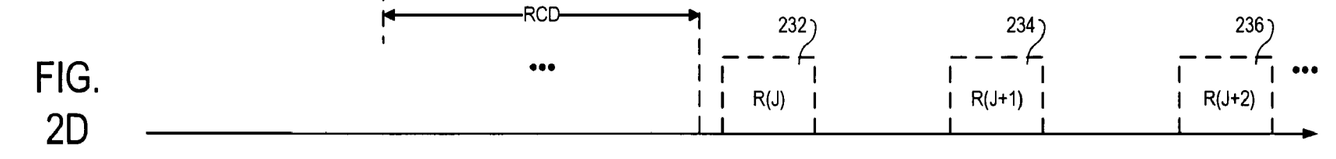

FIG. 2D shows redundant encoded frames R(J) 232, R(J+1) 234, R(J+2) 236, as delayed by delay 145. They are the same data as in FIG. 2C, only delayed relative to their corresponding original encoded frames O(J) 222, O(J+1) 224, O(J+2) 226.

Importantly, FIG. 2D illustrates the amount of redundant coding delay ("RCD"). It is the time difference, measured along the data stream segment 210 of FIG. 2A, between the original encoded frame and its corresponding redundant encoded frame. RCD is thus properly measured in terms of time. RCD can be adjusted according to the invention, as is described later in this document.

Figure 2E:
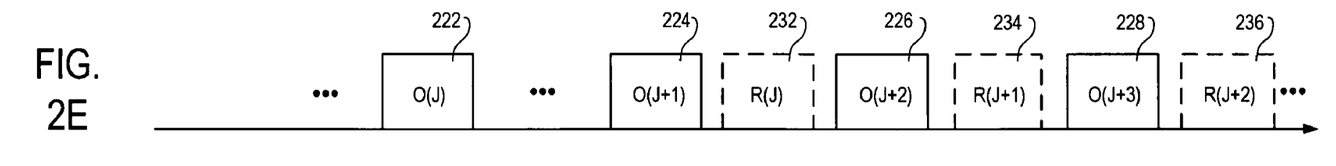

FIG. 2E shows the encoded frames output by buffer 130 into network 30. These include the original encoded frames O(J) 222, O(J+1) 224, O(J+2) 226, O(J+3) 228 of FIG. 2B, along with the delayed redundant encoded frames R(J) 232, R(J+1) 234, R(J+2) 236 of FIG. 2D. In other words, FIG. 2E is created by adding FIG. 2B with FIG. 2D.

In FIG. 2E, the original encoded frames O(J) 222, O(J+1) 224, O(J+2) 226, O(J+3) 228 (as depicted in FIG. 2B) and the delayed redundant encoded frames R(J) 232, R(J+1) 234, R(J+2) 236 are packetized and transmitted.

The present discussion is mainly in terms of frames, as opposed to packets. While frames are transmitted through the network in packets, it is the frames that carry the voice data. According to the present invention, an original encoded frame (such as O(J+2) 226) may or may not be combined in the same packet with an adjacent redundant encoded frame (such as R(J+1) 234). Such combination is advantageous, however, so as to reduce packet header overhead.

The drawing of FIG. 2E makes it easy to measure RCD also in terms of how many frames a redundant frame occurs after its corresponding original frame. For example, in FIG. 2E, that is between 1 and 2 frames. This may be converted to time, by multiplying with the chosen duration of the frames of FIG. 2A. Assuming 20 msec frames, the RCD in FIG. 2E is then 20-40 msec.

Figure 3A:
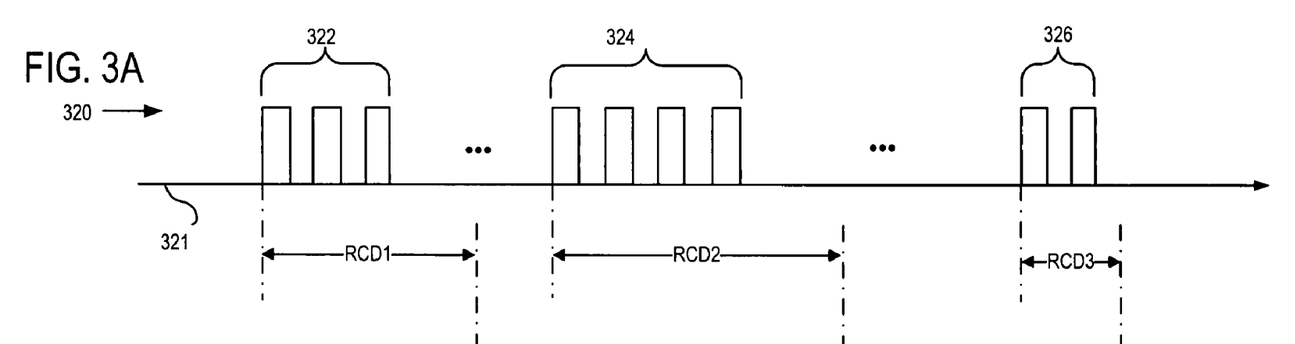
FIG. 3A is a diagram of encoded original data packets according to an embodiment of the invention.

Referring now to FIG. 3A, a stream 320 of original data packets is depicted along a time axis 321. Only selected groups 322, 324, 326 of these original packets are shown with their individual packets. FIG. 3A corresponds to FIG. 2B.

Figure 3B:
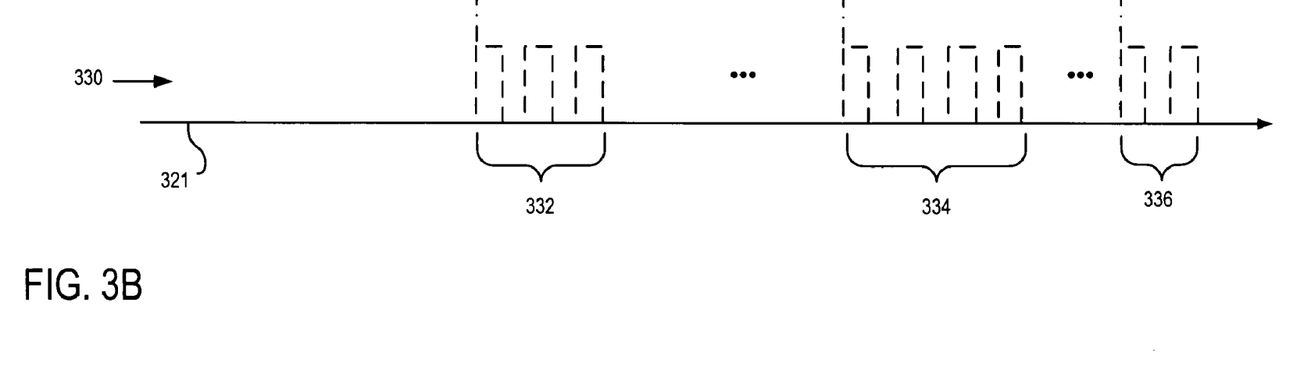
FIG. 3B is a diagram of redundant data packets corresponding to those of FIG. 3, but having adjusted redundant encoding delays according to the invention.

Referring now to FIG. 3B, a stream 330 of redundant data packets is depicted along the same time axis 321. Only selected groups 332, 334, 336 of these redundant packets are shown, those that correspond to groups 322, 324, 326. FIG. 3B corresponds to FIG. 2D.

Referring now to both FIG. 3A and FIG. 3B, pairings of groups are examined. It will be observed that the pair of original group 322 with its corresponding redundant group 332 has a redundant coding delay of RCD1. Moreover, the subsequent pairs have a different redundant coding delay of RCD2, and then later a yet different delay of RCD3. These different values are accomplished within the same stream according to the invention. Changing the value of the redundant coding delay is accomplished on the fly, responsive to control signal CTRL.

The invention need not necessarily be concerned with possible overlapping of the packets of FIG. 3A and FIG. 3B, once they are combined. Transmit buffer 130 may adjust for that by slight shifting, but the redundant coding delays RCD1, RCD2 RCD3 are built in, and secured by time stamps.

Figure 4:
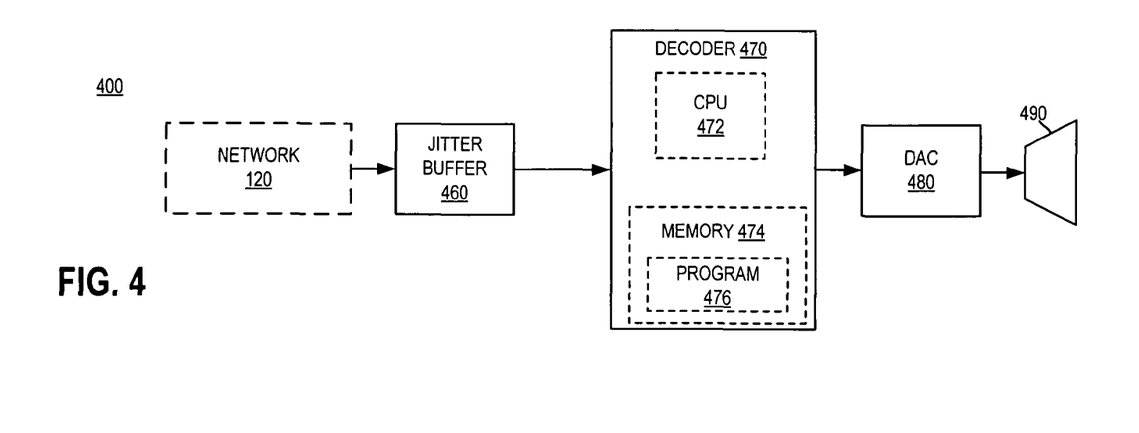
FIG. 4 is a block diagram of a receiving device made according to another embodiment of the invention.

Referring to FIG. 4, a receiving device 400 according to the invention is described. Device 400 may be an (IP) phone. But device 400 may also be a network retransmitting device, such as a network switch, e.g. a router, a gateway, a bridge, etc.

Device 400 includes a network interface (not shown separately) for interfacing with network 30. The network interface can be implemented as a stand-alone feature, or in conjunction with another component, such as a jitter buffer.

Optionally and preferably device 400 includes a jitter buffer 460. Jitter buffer 460 stores a number of packets immediately as they are received from the network 30. This includes both original and redundant packets. Once an original packet is received, its corresponding redundant packet may be discarded from jitter buffer 460. If an original packet is lost or not received in time for playout, its corresponding redundant packet is sought so that the payload of the lost original packet may be reconstructed.

Jitter buffer 460 thus prevents the jitter that would be experienced, if frames were played out at the exact moment they are received, and in the exact order they are received. That order could be scattered, due to the nature of transmission through the network 30. Plus the packets could arrive bunched, thus leaving gaps.

Device 400 also includes a decoder 470. One or more of the components of device 400 can be implemented in combination with each other, consistently with components of this description. In the embodiment of FIG. 4, decoder 470 includes a processor 472, which may be a Digital Signal Processor (DSP). Processor 472 may also be made from a Central Processing Unit (CPU) 472, and a memory 474. The processor 472 is adapted to perform the method of the invention. Preferably it is so adapted by running a program 476 made according to the invention, which resides on memory 474.

Device 400 can also include other components, such as a Digital to Analog Converter (DAC) 480. This converts the decoded voice data into an analog signal, which can be input in a speaker 490.

Figure 5:
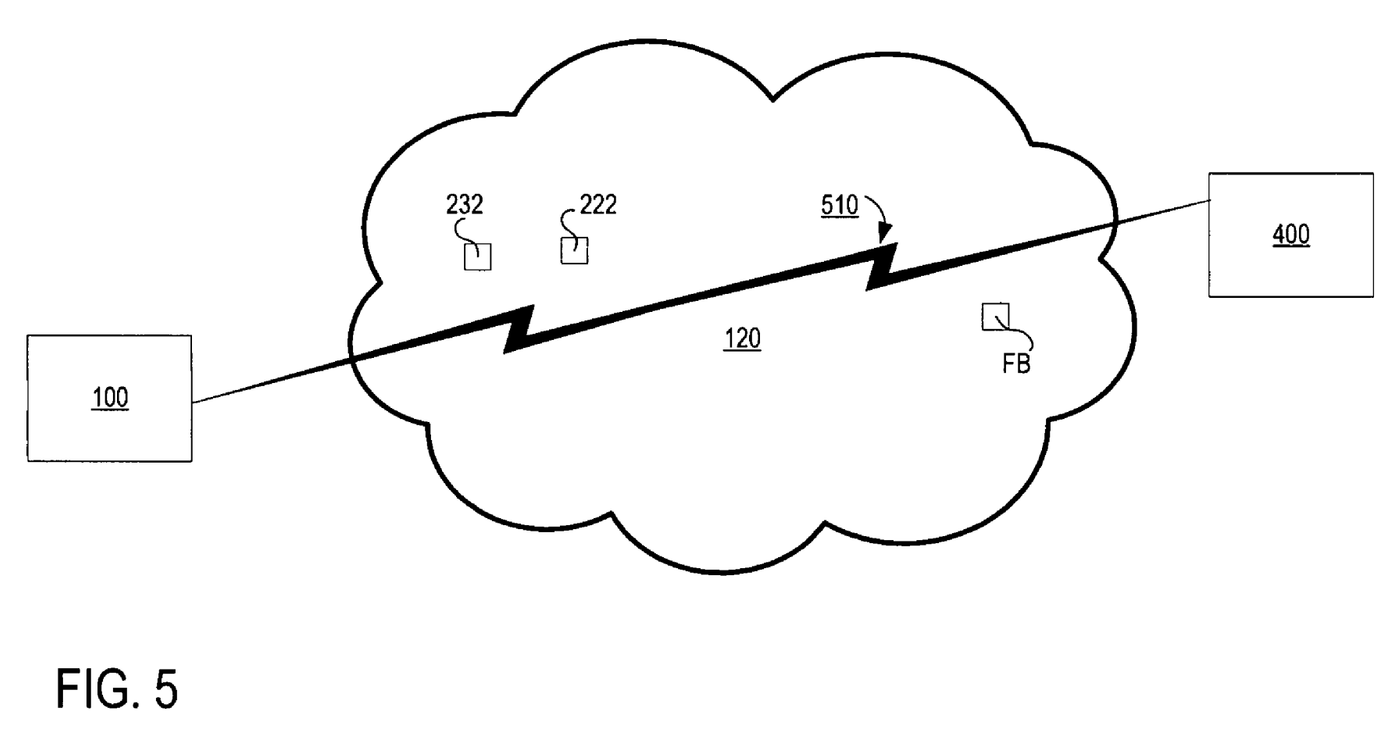
FIG. 5 is a diagram of network transmissions between the device of FIG. 1 and FIG. 4.

Referring now to FIG. 5, a configuration according to the invention is described. The device 100 of FIG. 1 has established a connection 510 with the device 400 of FIG. 4. Connection 510 may be made using a VoIP protocol over a network 30, such as the interne. Connection 510 is also known as channel.

Device 100 transmits a packet containing an original encoded frame 222 along connection 510, and then a packet containing a redundant encoded frame 232. These are received by device 400.

Redundant encoded frame 232 has been encoded a redundant coding delay ("RCD") time after its corresponding original encoded frame 222. The RCD does not speak, however, to when frame 232 will be received in relation to frame 222.

In some embodiments of the invention, device 400 gauges the performance of network 30, and may send back a feedback packet FB. Feedback packet FB may be implemented in conjunction with signaling schemes. One such scheme may be RTP-NSE (Real-Time Transport Protocol Named Signaling Events). Another such scheme may be RTCP (RTP Control Protocol) report extensions, etc.

Later in this document it will be seen that the feedback packet FB may be used for determining the control signal CTRL of FIG. 1, if the control signal CTRL is not determined exclusively by device 100. In those cases, it will be seen how the payload of feedback packet FB is determined to adjust the RCD on the fly, according to the invention.

The present invention may be implemented by one or more devices that include logic circuitry. The device performs functions and/or methods as are described in this document. The logic circuitry may include a processor that may be programmable for a general purpose, or dedicated, such as microcontroller, a microprocessor, a Digital Signal Processor (DSP), etc. For example, the device may be a digital computer like device, such as a general-purpose computer selectively activated or reconfigured by a computer program stored in the computer.

Moreover, the invention additionally provides methods that are described below. The methods and algorithms presented herein are not necessarily inherently associated with any particular computer or other apparatus. Rather, various general-purpose machines may be used with programs in accordance with the teachings herein, or it may prove more convenient to construct more specialized apparatus to perform the required method steps. The required structure for a variety of these machines will become apparent from this description.

In all cases, there should be borne in mind the distinction between the method the invention itself and the method of operating a computing machine. The present invention relates both to methods in general, and also to steps for operating a computer and for processing electrical or other physical signals to generate other desired physical signals.

The invention additionally provides programs, and methods of operation of the programs. A program is generally defined as a group of steps leading to a desired result, due to their nature and their sequence. A program made according to an embodiment of the invention is most advantageously implemented as a program for a computing machine, such as a general-purpose computer, a special purpose computer, a microprocessor, etc.

The invention also provides storage media that, individually or in combination with others, have stored thereon instructions of a program made according to the invention. A storage medium according to the invention is a computer-readable medium, such as a memory, and is read by the computing machine mentioned above.

The steps or instructions of a program made according to an embodiment of the invention requires physical manipulations of physical quantities. Usually, though not necessarily, these quantities may be transferred, combined, compared, and otherwise manipulated or processed according to the instructions, and they may also be stored in a computer-readable medium. These quantities include, for example electrical, magnetic, and electromagnetic signals, and also states of matter that can be queried by such signals. It is convenient at times, principally for reasons of common usage, to refer to these quantities as bits, data bits, samples, values, symbols, characters, images, terms, numbers, or the like. It should be borne in mind, however, that all of these and similar terms are associated with the appropriate physical quantities, and that these terms are merely convenient labels applied to these physical quantities, individually or in groups.

This detailed description is presented largely in terms of flowcharts, display images, algorithms, and symbolic representations of operations of data bits within at least one computer readable medium, such as a memory. An economy is achieved in the present document in that a single set of flowcharts is used to describe both methods of the invention, and programs according to the invention. Indeed, such descriptions and representations are the type of convenient labels used by those skilled in programming and/or the data processing arts to effectively convey the substance of their work to others skilled in the art. A person skilled in the art of programming may use these descriptions to readily generate specific instructions for implementing a program according to the present invention.

Often, for the sake of convenience only, it is preferred to implement and describe a program as various interconnected distinct software modules or features, individually and collectively also known as software and softwares. This is not necessary, however, and there may be cases where modules are equivalently aggregated into a single program with unclear boundaries. In any event, the software modules or features of the present invention may be implemented by themselves, or in combination with others. Even though it is said that the program may be stored in a computer-readable medium, it should be clear to a person skilled in the art that it need not be a single memory, or even a single machine. Various portions, modules or features of it may reside in separate memories, or even separate machines. The separate machines may be connected directly, or through a network, such as a local access network (LAN), or a global network, such as the Internet.

In the present case, methods of the invention are implemented by machine operations. In other words, embodiments of programs of the invention are made such that they perform methods of the invention that are described in this document. These may be optionally performed in conjunction with one or more human operators performing some, but not all of them. As per the above, the users need not be collocated with each other, but each only with a machine that houses a portion of the program. Alternately, some of these machines may operate automatically, without users and/or independently from each other.

Methods of the invention are now described.

Figure 6:
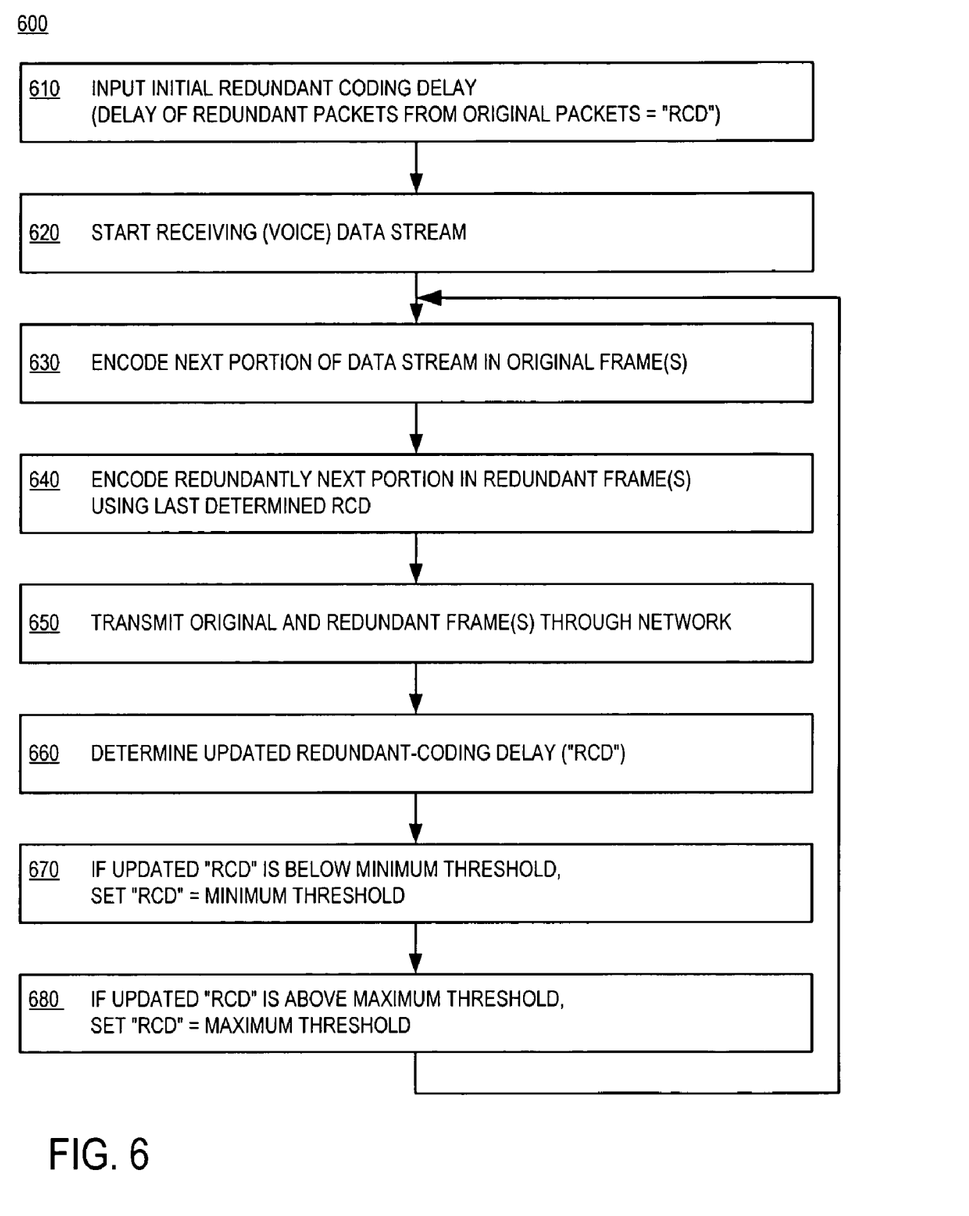
FIG. 6 is a flowchart illustrating a method according to an embodiment of the present invention.

Referring now to FIG. 6, a flowchart 600 is used to illustrate a method according to an embodiment of the invention. The method of flowchart 600 may also be practiced by device 100.

According to a box 610, a value is input for an initial redundant coding delay ("RCD"). This value is also known as a present value.

According to a next box 620, a data stream starts being received. The data stream may be a voice data stream.

According to a next box 630, a next portion of the data stream is encoded in one or more original frames.

According to a next box 640, the same portion of the data stream is encoded redundantly in redundant frames. Redundant encoding is performed using the last determined RCD. If this is the first time this happens, then the last determined RCD is the present value input in box 610.

According to a next box 650, the original frames and the redundant frames are transmitted through a network. They are transmitted as packets.

According to an optional next box 660, an updated value is determined for the RCD. The updated value may well be different from the immediately previous value, such as the initial value. The updated value may be determined from feedback signal received through the network. Or it may be determined internally from a device executing the method of the invention.

Determination of the updated value may be by first determining at least one performance parameter of the network, after encoding and the transmission has started. The updated value may be expressed as an instruction to increment or decrement the present value.

Alternately, an ideal value of a redundant encoding delay may be determined from the performance parameter. In one embodiment, a return stream of VoIP packets is received, and its inherent return RCD is determined. That can serve as the performance parameter, especially if the network channel is assumed to be symmetric (i.e. exhibit the same behavior in each direction).

Once having determined the performance parameter, the ideal value may be determined by using a look up table or a polynomial curve fit, etc. The ideal value may be expressed as an offset from the present value. The offset may be computed as a percentage difference, e.g. a fraction of the difference in values over one of the two values.

In yet one more group of embodiments, the performance parameter is determined in terms of the burstiness of the network. In other words, losses of packets are considered to be according to a bursty model. Accordingly, episodes are considered of where consecutive packets are received or lost.

In a first embodiment, an episode length number is determined, e.g. by counting. Those may be for the overall stream, or only within a moving time window. A time difference between consecutive episodes may be determined. Also, an average and/or variance of such episode length numbers are computed. The RCD should be larger than the average.

In a second embodiment, a two-state Markov chain model is used. In other words, a good state is postulated for no packets lost, and a bad state is postulated for packets lost. When, after at least one packet is received, one is lost, that means a transition from the good state to the bad state. A p number is determined (e.g. by counting) for such transitions. In addition, a q number may be determined for counting the complementary transitions (i.e. from the bad state to the good state).

In addition, these numbers p and q may be used to derive transition probabilities P, Q, for measuring the burstiness of the packet loss. For example, Q may be computed as q/(# of lost packets). When the transition probability Q is low, likelihood of a long burst of packet loss is high, and a longer RCD is required to overcome it. The average loss rate r may be computed from (# of lost packets)/(# of total packets), and may also be computed from p and q. Again, these statistics may be tracked for the entire data stream, or for a moving time window.

According to an optional next box 670, if the updated value of the RCD is below a preset minimum threshold, then it is set equal to that minimum threshold.

According to an optional next box 680, if the updated value of the RCD is above a preset maximum threshold, then it is set equal to that maximum threshold.

Execution then may return to box 630, for the next portion, until the data stream is concluded.

Figure 7:
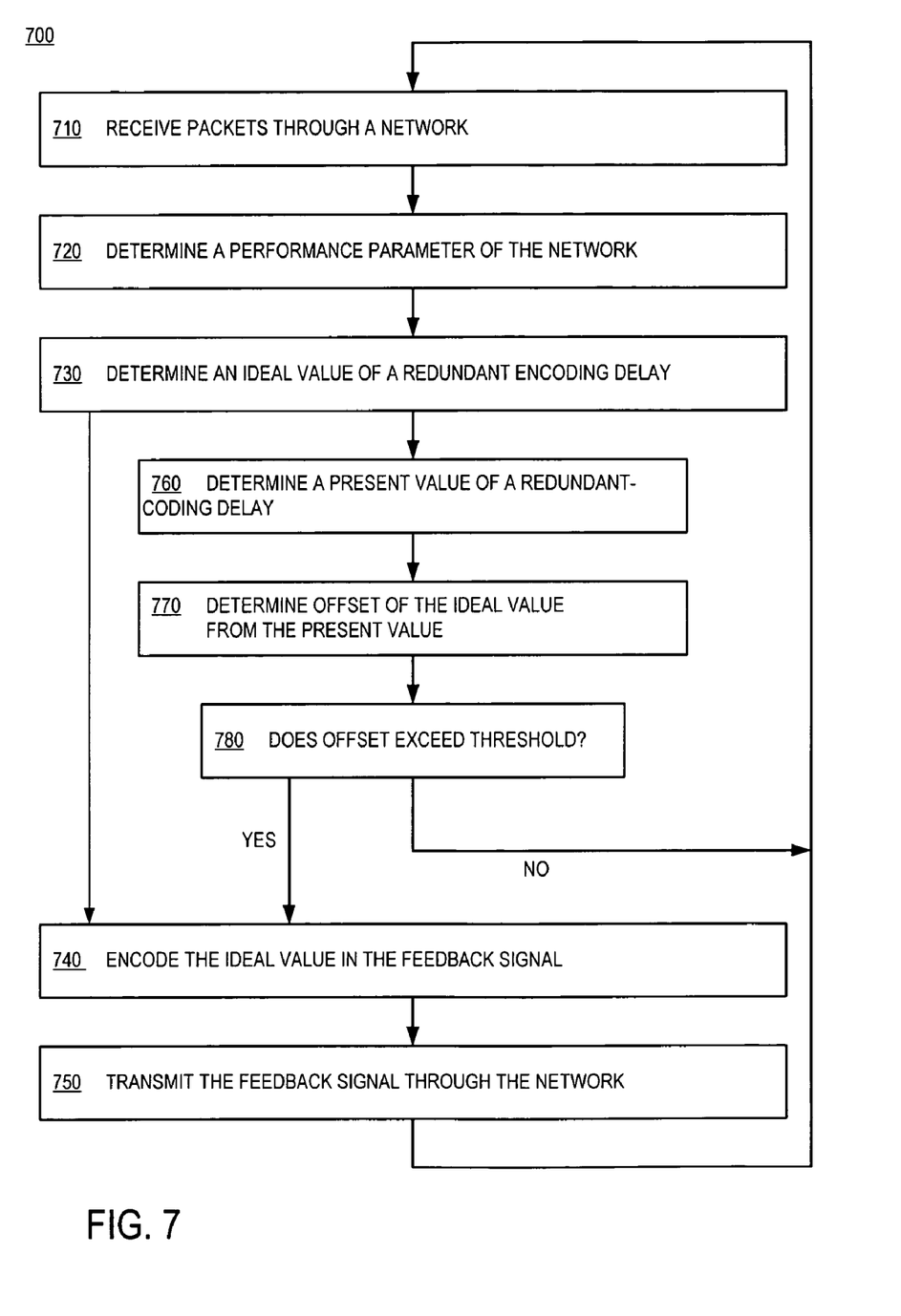
FIG. 7 is a flowchart illustrating a method according to another embodiment of the present invention.

Referring now to FIG. 7, a flowchart 700 is used to illustrate a method according to another embodiment of the invention. The method of flowchart 700 may also be practiced by device 400 of FIG. 5. In other words, device 400 may cooperate with the transmitting device 100.

According to a box 710, packets are received through a network.

According to an optional next box 720, a performance parameter of the network is determined. This may be performed in ways similar to what was described in connection with FIG. 6 above, e.g. by determining how many packets are lost, etc. . . . Moreover, device 400 is additionally capable of determining the network performance parameter from the reception of the packets. The performance parameter itself may be a return redundant coding delay of frames contained in the received packets.

According to a next box 730, an ideal value of a RCD is determined. This can be accomplished as per the above. The ideal value may be found explicitly from a table look up, a polynomial curve fit, etc. . . .

In one embodiment, according to a next box 740, the ideal value is encoded in a feedback signal, such as signal FB of FIG. 5. Then according to a next box 750, the feedback signal is transmitted through the network. Execution then returns to box 710.

In another embodiment, according to an optional next box 760, a present value of RCD is determined after box 730. Then according to a next box 770, the ideal value is compared with the present value, to determine an offset. Then according to an optional next box 780, it is inquired if the offset exceeds a preset threshold. If yes, execution continues to box 740. If not, it returns to box 710.

A person skilled in the art will be able to practice the present invention in view of the description present in this document, which is to be taken as a whole. Numerous details have been set forth in order to provide a more thorough understanding of the invention. In other instances, well-known features have not been described in detail in order not to obscure unnecessarily the invention.

While the invention has been disclosed in its preferred form, the specific embodiments as disclosed and illustrated herein are not to be considered in a limiting sense. Indeed, it should be readily apparent to those skilled in the art in view of the present description that the invention may be modified in numerous ways. The inventor regards the subject matter of the invention to include all combinations and subcombinations of the various elements, features, functions and/or properties disclosed herein.

The following claims define certain combinations and subcombinations, which are regarded as novel and non-obvious. Additional claims for other combinations and subcombinations of features, functions, elements and/or properties may be presented in this or a related document.

The invention claimed is:

1. A device comprising:
a jitter buffer for receiving packets through a network;
a processor coupled with the jitter buffer, wherein the processor is configured to:
determine one or more performance parameters of the network based on reception of the packets wherein at least one performance parameter is based on one or more lengths of episodes of consecutively lost packets;
postulate a good state for no packets lost, a bad state for packets lost;
count a p number for transitions from one of the good state and the bad state to the good state or the bad state;
determine a q number complementary to the p number;
computer a loss rate based on the p number and the q number;
determine an ideal value of a redundant encoding delay based on the one or more performance parameters;
encode the ideal value in a feedback signal; and
transmit the feedback signal through the network.

2. The device of claim 1, wherein the one or more performance parameters is a return redundant coding delay of frames contained in the received packets.

3. The device of claim 1, wherein the processor is further configured to determine the ideal value from one or more performance parameters using one of a look up table and a polynomial curve fit.

4. The device of claim 1, wherein the processor is further configured to:
determine a present value of a redundant-coding delay based on reception of the packets; and
determine an offset of the ideal value from the present value, wherein the ideal value is encoded in the feedback signal only if the offset exceeds a threshold.

5. The device of claim 1, wherein the processor is further configured to determine the one or more performance parameters by determining an episode length of an episode of consecutively received packets.

6. The device of claim 5, wherein the processor is further configured to determine the one or more performance parameters, by determining at least one of an average and a variance of two or more of the episode lengths of at least one of the episode of consecutively lost packets or the episode of consecutively received packets.

7. The device of claim 5, wherein the episode lengths of at least one of the episode of consecutively lost packets or the episode of consecutively received packets is determined for an episode within a moving time window.

8. The device of claim 5, wherein the processor is further configured to determine a time difference between consecutive episode of at least one of the consecutively lost packets or the consecutively received packets.

9. The device of claim 1, wherein the p number is counted within a moving time window.

10. A device comprising:
means for receiving packets through a network;
means for determining one or more performance parameters in real time of the network based on reception of the packets, wherein at least one performance parameter is based on the length numbers of one or more episodes of consecutive lost packet;
means for postalating a good state for no packets lost, and a bad state for packets lost;
means for counting a p number for transitions from one of the good state and the bad state to the good state or the bad state;
means for determining a q number complementary to the p number;
means for computing a packet loss rate based on the p number and the q number;
means for determining an ideal value of a redundant encoding delay based on the one or more performance parameters, wherein the ideal value is variable in real time or responsive to a current network condition or combinations thereof;
means for encoding the ideal value in a feedback signal; and
means for transmitting the feedback signal through the network.

11. The device of claim 10, wherein the one or more performance parameters include a return redundant coding delay of frames contained in the received packets.

12. The device of claim 10, wherein the ideal value is determined from the one or more performance parameters using look up table or a polynomial curve fit, or combinations thereof.

13. The device of claim 10, further comprising:
means for determining a present value of a redundant-coding delay based on reception of the packets; and
means for determining an offset of the ideal value from the present value, wherein the ideal value is encoded in the feedback signal only if the offset exceeds a threshold.

14. The device of claim 13 wherein the offset is computed as a fraction of a difference between the ideal value and the present value over one of the ideal value and the present value.

15. The device of claim 10, wherein the means for determining the one or more performance parameters includes a means for determining one or more length numbers of one or more episodes of consecutively received packets.

16. The device of claim 15, wherein the means for determining the one or more performance parameters includes a means for determining at least one of an average and a variance of two or more of the episode length numbers corresponding to the one or more episodes of consecutively lost packets or the one or more episodes of consecutively received packets, or combinations thereof.

17. The device of claim 16, wherein at least one of the episode length numbers is determined for an episode of at least one of the consecutively lost packets or the consecutively received packets within a moving time window.

18. The device of claim 16, further comprising a means for determining a time difference between successive episodes of the consecutively lost packets or the consecutively received packets, or combinations thereof.

19. The device of claim 10, wherein the p number is counted within a moving time window.

20. An article comprising a non-transitory storage medium, the non-transitory storage medium having instructions stored thereon, wherein, when the instructions are executed by at least one device, they result in:
receiving packets through a network;
determining one or more performance parameters of the network based on reception of the packets, wherein at least one performance parameter is based on one or more lengths of episodes of consecutively lost packets;
postulating a good state for no packets lost, a bad state for packets lost;
counting a p number for transitions from one of the good state and the bad state to the good state or the bad state;
determine a q number complementary to the p number;
computing a loss rate from the p number and the q number;
determining an ideal value of a redundant encoding delay based on the one or more performance parameters;
encoding the ideal value in a feedback signal; and
transmitting the feedback signal through the network.

21. The article of claim 20, wherein at least one performance parameter is a return redundant coding delay of frames contained in the received packets.

22. The article of claim 20, wherein the ideal value is determined from at least one of the performance parameters using one of a look up table and a polynomial curve fit.

23. The article of claim 20, wherein the instructions further result in:
determining a present value of a redundant-coding delay based on reception of the packets; and
determining an offset of the ideal value from the present value, wherein the ideal value is encoded in the feedback signal only if the offset exceeds a threshold.

24. The article of claim 23, wherein the offset is computed as a fraction of a difference between the ideal value and the present value over one of the ideal value and the present value.

25. The article of claim 20, wherein at least one performance parameter includes determining an episode of consecutively received packets.

26. The article of claim 25, wherein determining the performance parameter further includes determining at least one of an average and a variance of two or more of the episode lengths of at least one of the consecutively lost packets or the consecutively received packets.

27. The article of claim 25, wherein the episode lengths of at least one of the consecutively lost packets or the consecutively received packets is determined for an episode within a moving time window.

28. the article of claim 25, wherein the instructions further result in determining a time difference between consecutive episodes of at least one of the consecutively lost packets or the consecutively received packets.

29. The article of claim 20, wherein the p number is counted within a moving time window.

30. A method comprising:
receiving packets through a network;
determining one or more performance parameters of the network based on reception of the packets wherein at least one performance parameter is based on one or more lengths of episodes of consecutively lost packets;
postulating a good state for no packets lost, a bad state for packets lost;
counting a p number for transitions from one of the good state and the bad state to the good state or the bad state;
determining a q number complementary to the p number;
computing a loss rate from the p number and the q number;
determining an ideal value of a redundant encoding delay based on the one or more performance parameters;
encoding the ideal value in a feedback signal; and
transmitting the feedback signal through the network.

31. The method of claim 30, wherein the one or more performance parameters is a return redundant coding delay of frame contained in the received packets.

32. The method of claim 30, wherein the ideal value is determined based on the one or more performance parameters using one of a look up table and a polynomial curve fit.

33. The method of claim 30, further comprising:
determining a present value of a redundant-coding delay based on e reception of the packets; and
determining an offset of the ideal value from the present value, wherein the ideal value is encoded in the feedback signal only if the offset exceeds a threshold.

34. The method of claim 33, wherein the offset is computed as a fraction of a difference between the ideal value and the present value over one of the ideal value and the present value.

35. The method of claim 30, wherein determining the one or more performance parameters includes determining one or more length numbers of one or more episodes of consecutively received packets.

36. The method of claim 35, wherein determining the performance parameter further includes determining at least one of an average and a variance of two or more of the episode lengths corresponding to the one or more episodes of consecutively lost packets or the one or more episodes consecutively received packets, or combinations thereof.

37. The method of claim 35, wherein the episode length number is determined for an episode within a moving time window.

38. The method of claim 35, further comprising determining a time difference between successive episodes of the consecutively lost packets or the consecutively received packets, or combinations thereof.

39. The method of claim 35, wherein the p number is counted within a moving time window.

* * * * *

UNITED STATES PATENT AND TRADEMARK OFFICE
CERTIFICATE OF CORRECTION

| | | |
|---|---|---|
| PATENT NO. | : 7,920,492 B1 | Page 1 of 1 |
| APPLICATION NO. | : 11/435002 | |
| DATED | : April 5, 2011 | |
| INVENTOR(S) | : Jagadeesan et al. | |

It is certified that error appears in the above-identified patent and that said Letters Patent is hereby corrected as shown below:

At column 9, line 34, please replace "computer" with --compute--.
At column 9, line 59, please replace "performance parameters," with --performance parameters--.
At column 10, line 13, please replace "consecutive lost packet;" with --consecutively lost packets;--.
At column 10, line 14, please replace "postalating" with --postulating--.
At column 10, line 27, please replace "condition" with --condition,--.
At column 10, line 38, please replace "using look up" with --using a look up--.
At column 11, line 16, please replace "determine" with --determining--.
At column 11, line 50, please replace "the article" with --The article--.

Signed and Sealed this
Fourth Day of October, 2011

David J. Kappos
*Director of the United States Patent and Trademark Office*